Jan. 6, 1959         A. J. TELLER          2,867,425
       MASS TRANSFER PROCESS AND PACKING UNITS THEREFOR
Filed Oct. 5, 1956                         2 Sheets-Sheet 1

AARON J. TELLER    INVENTOR.
BY Roger T. Martin
   Attorney

Jan. 6, 1959  A. J. TELLER  2,867,425
MASS TRANSFER PROCESS AND PACKING UNITS THEREFOR
Filed Oct. 5, 1956  2 Sheets-Sheet 2

AARON J. TELLER  INVENTOR.

BY

United States Patent Office 2,867,425
Patented Jan. 6, 1959

2,867,425

MASS TRANSFER PROCESS AND PACKING UNITS THEREFOR

Aaron J. Teller, Gainesville, Fla., assignor to The Harshaw Chemical Company, Cleveland, Ohio, a corporation of Ohio Application October 5, 1956, Serial No. 614,270

6 Claims. (Cl. 261—95)

This invention relates to units of packing material and to the use thereof in liquid-gas contact processes.

The movement of one or more components between phases occurs in many operations and is known as mass transfer. The absorption of a volatile component from a vapor phase, the extraction of a component from a solid by solution in a liquid, the separation of volatile components of a liquid by distillation are examples of separation by mass transfer. This invention relates to units of packing material which may be employed in mass transfer processes involving the transfer of one or more components between fluid phases. More particularly the invention is directed, in one of its applications, to mass transfer processes involving the transfer of components between liquid and gas phases. It will be apparent, however, that the units of packing material described herein also have considerable utility in liquid-liquid phase mass transfer operations, as well as the other mentioned mass transfer operations.

The design of packing for diffusional operations involving mass transfer between liquid and gas phases has been based on two major factors, namely large wetted surface and large free volume. The factor of large wetted surface has been considered of utmost importance in attaining large transfers of material between the liquid and vapor phases. Large free volume is considered extremely important as minimizing resistance to passage of gases or vapor through the column.

While it has been recognized that there is some interstitial hold-up in any packed tower, it has been regarded as perhaps undesirable rather than useful. I have now discovered that high interstitial hold-up is a factor much to be desired, and may, at desirable levels, even profitably replace the factor of large wetted surface as the principal means of transfer between the liquid and vapor phases. As a consequence of this discovery I have designed certain unit packings which function most effectively in increasing the interstitial hold-up of liquid when compared with conventional unit packings. These unit designs have been found far superior to the more common unit packing designs, exemplified by berl saddles and Raschig rings, in performance in mass transfer processes involving the transfer of one component of a gas or liquid between a liquid and a gas phase. Additionally, I have discovered that further benefits in the form of superior performance may be obtained when packing units of the design hereinafter described are made of material or coated with a material which is substantially unwetted by the liquid of the liquid phase in liquid-gas mass transfer operations. Still further I have discovered that when my unit packing material is composed of material which is substantially unwetted that still greater benefits may be derived when the packing bed is confined by walls which also present an unwetted surface with respect to the liquid in liquid-gas mass transfer operations.

Accordingly, it is an object of the invention to provide for new unit packing materials which promote high interstitial hold-up of liquid in liquid-gas diffusional operations. It is another object of the invention to provide a unit packing material for mass transfer processes. It is still another object of the invention to provide for unit packing material having special utility in liquid-gas mass transfer processes wherein a component of the liquid or gas is transferred between a liquid and a gas phase through the intimate contact of the component of the liquid or gas phase with the other phase in a bed of packed material. It is still another object to provide for processes of the mass transfer type involving the transfer of a component between a liquid and a gas phase wherein novel unit packing materials are utilized in effecting the transfer. Other and more specific objects will be in part obvious and in part pointed out below and/or illustrated in the accompanying diagrams.

Figure 7:
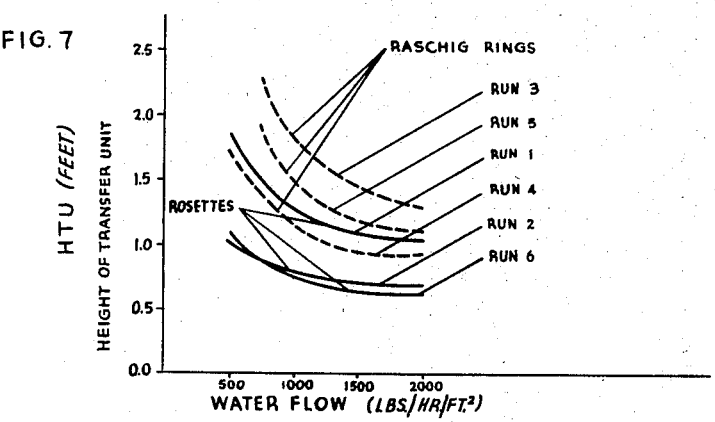

Figure 7 is a graphic representation of the benefits to be derived from the invention in an ammonia-air-water system, and shows performance curves obtained from the use of the novel unit packing material described hereinafter and performance curves obtained from the use of Raschig rings under substantially identical conditions wherein the ammonia component of a gaseous ammonia-air mixture is absorbed in water through intimate contact of the two phases in a packed column. The figure additionally depicts the advantageous results to be obtained through the utilization of the novel packing units in a bed of packing material which is confined by wall surfaces having unwetted properties.

Figure 8:
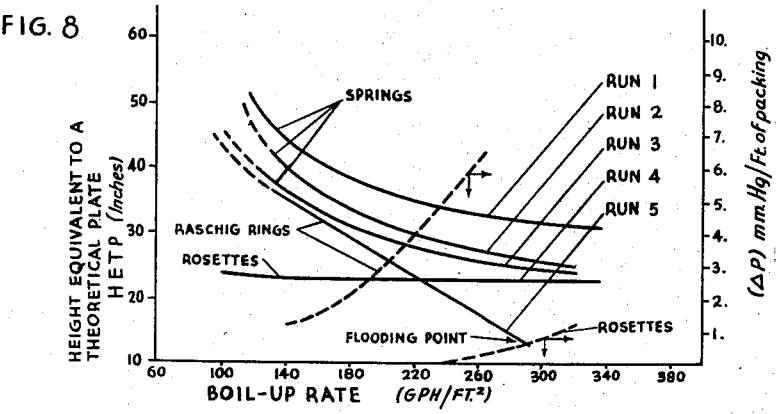

Figure 8 is a graphic representation of the benefits to be derived from the invention and shows performance curves obtained in a benzene-ethylene dichloride distillation system when utilizing the novel units of the invention and sets forth comparative performance curves obtained through the use of other packing materials.

Figure 9:
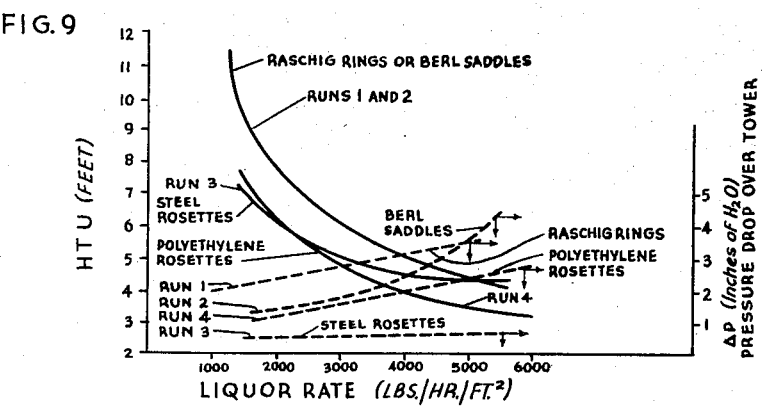

Figure 9 is a graphic representation of the benefits to be derived from the invention in a carbon dioxide-air-monoethanolamine-water system wherein performance curves are set forth showing the benefits to be derived from the invention as compared to performance curves for other packings such as Raschig rings and berl saddles in the same system.

Figure 1:
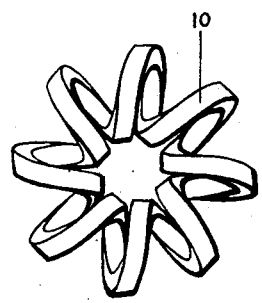
Figure 1 is a plan view of one form of the packing according to the invention.
Figure 3:
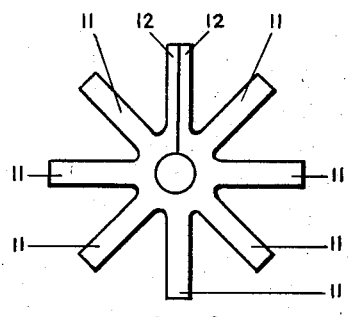
Figure 3 is a plan view of another form of packing according to the invention.
Figure 2:
Figure 2 is an elevation thereof.

Referring now to the accompanying drawings, I have shown in Figures 1 and 2 two views of a unit of tower packing which is well adapted to realize the benefits of the invention. This unit consists of a single filament 10 which is first formed into a helix having eight convolutions and then the helix bent around and the ends joined so that the unit may then be considered as having a toroidal shape defined by eight spaced, circular filament portions, each corresponding to one convolution of the helix wherein the spaced, circular filament portions are continuous with adjacently spaced filament portions in end to end relationship, being integral and continuous. It is immaterial whether the shape of this unit be referred to as a helical torus or as a toroidal helix and the number of convolutions may be greater or less than eight, although for best results there should be at least six convolutions and not more than twelve. Eight is believed to be the optimum. Although the unit described above and set forth in Figures 1 and 2, may be made by first forming a single filament such as 10 into the form of a helix and thereafter bending the helix around and joining the ends thereof, it is not essential that the ends be joined so long as substantially the same form of unit, namely a toroidal helix, is produced. If the filament is sufficiently rigid, it will retain its shape even though the ends are not actually joined. The convolutions of the toroid helix of Fig. 1 and the loops of Fig. 3 are approximately circular but can depart more or less from true circular. It may be, for example, polygonal. Such variations are obviously equivalent to the forms shown and are intended to be included in the term, "approximately circular." If the unit is composed of polyethylene or polyfluoroethylene, or a polychlorofluoroethylene (e. g. polymerized $CClF=F_2$) it will be sufficiently flexible to permit easy forming into the toroidal shape. Additionally, in such a case where the unit is made of these materials, the unit will also have the nonwetting characteristics which are quite desirable as hereinafter pointed out. By "nonwetting," it is meant that the liquid has less attraction for the surface than required to overcome its own surface tension so that it tends rather to form aggregates than to spread out over the surface in a film. In speaking of a filament "depth" herein with respect to a rosette of the toroidal spaced filament type there is meant the thickness of the filament measured on a radius, as for instance the distance from point 7 to point 8 on Figure 2. The "width" of the filament is that corresponding to the distance between points 5 and 6.

Figure 4:
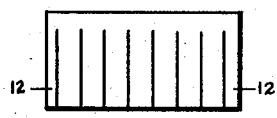
Figure 4 is an elevation showing the unit of Figure 3 in a partially fabricated condition.
Figure 5:
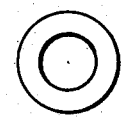
Figure 5 is an end view of the unit in the condition shown in Figure 4.

In Figures 3 and 4, there is shown a similarly shaped unit which may be formed by slicing nearly through a tubular element having the cross-section shown in Figure 5 and having the cuts indicated in Figure 4 and then bending the unit around to the position shown in Figure 3 and joining the portions 12 (as by fusing in the case where the material of construction is a thermoplastic such as polyethylene) so that there results a unit having seven rings 11 and one ring 12 made up of the two half thicknesses. It will be apparent that the unit described and shown in Figures 3, 4, and 5 likewise has a toroidal shape defined by spaced approximately circular filament portions such as 11 and 12.

It will be obvious that other torus shaped units may be made wherein the toroidal shape is defined by spaced filament portions and that accordingly the particular shapes set forth in Figures 1 through 5, which may be termed "rosettes" are not to be construed as limiting the scope of the invention to the precise shapes shown. For example, the filaments may be rectangular, square, circular, or any other appropriate shape in cross-section so long as the toroidal shape of the unit is maintained wherein the torus is in effect substantially defined by spaced, approximately circular filament portions. Variations, accordingly, may be made in the shapes illustrated, but it is desirable to preserve the filamentous character of the packing, its ability to interlock one unit with another, and its characteristic of having numerous bends which may be curves as shown or angles such as might be the result, for example, if the cross-section of the tubular element in Figure 4 were not circular as shown in Figure 5 but polygonal. Preferably the unit is manufactured from polyethylene, polychloroethylenes, polychlorofluoroethylenes, or polyfluoroethylenes so that the unit will also have flexibility as well as the nonwetting property.

For best results, the gross volume of each unit should be from 4 to 20 times its displacement volume, and the bulking volume of each unit should be from 50% to 90% of the gross volume. The term "gross volume" as used herein means the volume of the smallest circumscribed solid free from concave surfaces. The term "displacement volume" as used herein with respect to a unit of tower packing means the volume of water displaced by the unit when it is submerged by water. The term "bulking volume" as used herein with respect to a unit of tower packing means the volume occupied per unit when a receptacle of cylindrical shape is filled with such units without compression beyond that due to their own weight to a depth equal to its diameter, the volume so filled being fifty times the gross volume of one unit. It will be apparent that the bulking volume is influenced by the ability of the units to interlock with each other. In the case of a ¾" x 1⅞" rosette, the volume of the circumscribed rectangular prism is about 2.6 cubic inches; the gross volume is about 1.9 cubic inches; and the bulking volume is about 1.4 cubic inches.

With respect to the size of the filaments, the minimum length for one approximately circular filament portion should be at least 8 times the cross-sectional dimension thereof, whereas the internal radius of curvature at all points within the torus suitably are less than 4 times the major cross-sectional dimension of the filament.

A volume of the units, compressed to 75% of the volume occupied when such units loosely fill a cylindrical receptacle having a minimum diameter three times the major dimension of each unit and a similar height, presents from 3 to 6 contact hold-up points per unit and from 5 to 10 inherent hold-up points per unit. The term "junction" as used in respect to a unit of packing means both those points at which a plurality of reaches of filament of the same unit, contact each other with or without being integrally connected. "Hold-up points" include junctions, downwardly presented bends, small horizontal upwardly presented surfaces, and points of contact and near contact between filaments of different packing units. "Contact hold-up points" include only points of contact and near contact between different packing units. "Inherent hold-up points" include all other hold-up points. Interstitial hold-up as used herein includes all aggregations of liquids in excess of the normal film thickness (if any film be present) over the major portion of the packing surface at bends, points of contact, points of near contact, and small horizontal upwardly presented surfaces.

Figure 6:
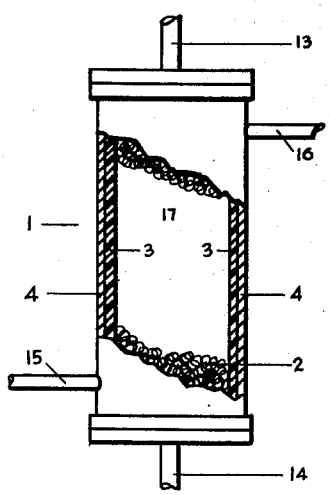
Figure 6 is a schematic section of a packed tower, randomly packed with unit packing material and lined with a nonwetted liner.

With respect to Figure 6, there is schematically shown a tower 1 containing packing material 2 wherein the packing material 2 is confined by a nonwetted wall 3 made, for example, as liner 3 for the side wall portions 4 of tower 1. The liner 3 of nonwetted material, as will subsequently appear increases the efficiency of a liquid-gas diffusional process by decreasing channeling along the wall or what is known as "wall effect." Pipes 13, 14, 15 and 16 are appropriately positioned to conduct the various phases into or from the packed bed 17 according to the particular liquid-gas contacting operation being carried out.

Discussion of Figure 7

The performance curves of Figure 7 illustrate the benefit to be derived from utilizing the unit packing materials of the invention in liquid-gas diffusional operations wherein the ammonia content of an air-ammonia mixture is absorbed in water by intimately contacting the gaseous phase with the liquid phase in a packed bed of the novel units. The curves further illustrate the benefit to be derived from utilizing the novel units of the invention in a liquid-gas diffusional operation wherein the gas and liquid phases are intimately contacted in a packed bed having a confining surface for the bed which is composed of nonwetted material. The curves also illustrate the effect of utilizing a nonwetted lining in a packed tower for purposes of decreasing the wall effect and increasing the efficiency of packing materials employed.

Each of the performance curves was obtained by passing an ammonia-air mixture at a gas volume of 500 lbs. per hour per squre foot of tower cross-section, up through a packed tower having a six inch internal diameter and by absorbing the ammonia content in water passed counter current thereto.

The curves corresponding to runs 3, 4, and 5 were obtained when the packing material employed was Raschig rings having an outside diameter of 3/4", a length of 3/4" and a wall thickness of 1/16". Glass Raschig rings and a glass lined tower were utilized for obtaining the curve corresponding to run 3 whereas glass Raschig rings and a polyethylene lined tower were utilized for obtaining the curve corresponding to run 4. Run 5 utilized polyethylene Raschig rings for the tower packing when the tower was lined with polyethylene.

By comparing the curves corresponding to run 3 and run 4, it is evident that a nonwetted surface lining in a packed tower greatly increases the efficiency of the packing units. It is believed that the nonwetted surface lining prevents channeling of the liquid along the wall thereof, and has a tendency to cause the liquid to go back into the packed bed, thereby diminishing the amount of channeling along the wall and the corresponding less efficiency associated with the wall effect. The curve corresponding to run 5 further illustrates the benefit to be derived from utilizing a nonwetted lining for packed beds regardless of the type packing. It will be noted that for run 5, the Raschig ring was made of polyethylene, thereby presenting a substantially nonwetted surface which diminishes the effectiveness of the Raschig rings. This was purposely done to illustrate the tremendous increases in efficiency associated with the utilization of a nonwetted lining in addition and emphasizes the important part which interstitial hold-up plays in packed bed operations as opposed to the large wetted surfaces. Thus in run 5 the large wetted surfaces of the Raschig rings were substantially eliminated through the use of a nonwetted material in the construction of the Raschig rings, thereby diminishing their efficiency. It is to be noted, however, that although a substantial decrease in the efficiency of the packing per se obviously results, nevertheless, this decrease in efficiency of the packing unit is compensated for through the use of a nonwetted tower lining for confining the packed bed of Raschig ring units.

The curves for runs 1 and 2 were obtained when utilizing a rosette substantially identical in construction to that shown in Figures 1 and 2, the rosette having an outside diameter for the helix of 3/4", an outside diameter of the torus of 1 7/8", a filament depth of 1/8" and a filament width of 1/8", the helix having nine convolutions. Run 1 was conducted utilizing rosettes which were constructed of polyethylene, the bed of rosettes being confined in a glass tower of the aforementioned size. For run 2 the same size polyethylene rosette was employed in a tower which was lined with polyethylene thereby presenting a nonwetted surface to the different phases in all respects.

It is evident from a consideration of the curves corresponding to runs 2 and 5, wherein the only difference in the runs was in the structure of the packing material utilized, that the rosettes are considerably more efficient than the conventionally employed Raschig rings. Thus the height of the transfer unit for the various flow rates utilized was always substantially less in the case where the rosettes were employed as a packing material.

Run 6 was conducted utilizing another size of rosette, namely, one wherein the outside diameter of the helix was 1/2", the outside diameter of the torus was 1 1/4", the filament depth and width of the filament were both 1/8" and the number of convolutions of the helix also 9. In this case the polyethylene rosettes were utilized also in a polyethylene lined tower. It is evident in both cases of different sized rosettes from the performance curves that the structure of the novel packing materially increases efficiency in the mass transfer process involving the movement of the ammonia from the gaseous phase to the liquid phase through the intimate contact of the ammonia containing gaseous phase with the water in a packed bed.

Dicussion of Figure 8

Figure 8 illustrates the surprising result which is accomplished by utilizing the novel packing in a benzene-ethylene dichloride distillation system through comparison with various helices from which the novel units of the invention may be manufactured by bending the helices around to form a toroidal helix. Figure 8 also illustrates the superiority of rosettes over Raschig rings in performance over a wide range of boil-up rates and additionally point up the considerable improvement in pressure drop attained through the use of the novel units.

The distillation process was conducted by passing an approximately equi-molal mixture of benzene and ethylene dichloride into an 8" steel packed tower operated under total reflux conditions whereby both the ethylene and benzene dichloride were returned to the system. In all runs the various unit packings were made of steel and the wall confining the packing material was similarly of steel.

In run 1 the packing unit was a spring where the outside diameter of the helix was 3/4", the length of the spring was 4 1/2", the filament depth was 1/32", the width of the filament was 1/8", and the distance between the metal in adjacent convolutions was 3/8", there being 9 convolutions in the helix. The packing material utilized for run 2 was also a spring having the same dimensions and numbers of convolutions as the spring utilized in run 1 except that the length of the helix was 3 1/2" and the distance between the metal on adjacent convolutions was 1/4". Springs were also used in run 3 having the same dimensions and numbers of convolutions as the springs in run 1 except that the length of the helix was 2 1/2" and the distance between the metal in adjacent convolutions was 1/8".

To clearly point up the superiority of the structure of the units described in this invention, the rosettes utilized in run 4 were made of the same dimensional material as the springs utilized in runs 1, 2 and 3 and also had 9 convolutions. Specifically the dimensions of the rosettes utilized in run 4 were an outside diameter of the helix of 3/4", an outside diameter of the torus of 1 7/8", a filament depth of 1/32", a filament width of 1/8", the helix having 9 convolutions.

The superiority of the construction according to the invention is evident from the consideration of curves associated with runs 1, 2, 3, and 4. It is clear in this system that a helix formed in the shape of a torus is far superior in performance over a wider range of boil-up rate than a helix which is not in the form of a torus. Accordingly, the efficiency of the rosettes is considerably greater than the efficiency of springs or mere helices.

Figure 8 also illustrates the superiority of rosettes over Raschig rings of a similar size. The Raschig rings utilized in run 5 had an outside diameter of 1", a length of 1" and a wall thickness of 1/16". The rosettes clearly have a lower height equivalent to a theoretical plate throughout substantially a broader range than the Raschig rings in this distillation system. It is also to be noted that the pressure drop per foot of packing in the case of the rosettes was substantially less than the pressure drop associated with the Raschig rings.

The performance curves for runs 4 and 5 further illustrate the fact that a major benefit may be obtained through the use of the novel unit packing material in that wider ranges of operation are permitted in a packed column while still operating at a peak or near peak efficiency. This is not the case with the Raschig rings as is well known since the peak efficiency of Raschig rings and other similar packing materials is when the bed is operated near the flooding point, i. e. usually about 60% to 80% of flooding beyond which the efficiency usually decreases. This, of course, means that Raschig rings must be employed under conditions which present an exceedingly high pressure drop at all times and are accordingly less desirable for this purpose.

Discussion of Figure 9

Figure 9 contains performance curves of an absorption system, specifically a system wherein carbon dioxide and air are intimately contacted with monoethanolamine and water as the liquid phase in an absorption tower whereby the carbon dioxide component of the gaseous phase is absorbed in the liquid phase, the carbon dioxide thereby moving from one phase to the other. As in the other systems discussed with respect to Figures 7 and 8 it will be evident that the rosette type structure is considerably superior in performance in the mass transfer type operation when compared to the more conventional types of packing units, namely Raschig rings and berl saddles. For the graphic presentation set forth in Figure 9, the height of the transfer unit is plotted as the ordinate in feet whereas the liquor rate is plotted as the abscissa. Superimposed upon the same figure, there is also a plot of the pressure drop over the tower in inches of water for the various liquor rates.

The absorption process was conducted according to conventional absorption operations wherein the gas is admitted to the tower at the bottom flowing upward therethrough, and the unabsorbed gas being removed from the top. Counter current to the flow of the gas, the liquid phase is passed into the top of the tower and removed from the bottom of the tower. The absorption process was carried out at about 100°–120° F. The monoethanolamine-water (liquid) phase utilized had from about 18% to 20% monoethanolamine and contained between 0.14 and 0.18 mol of carbon dioxide per mol of monoethanolamine. The tower employed had an internal diameter of 8" and was lined with a polyethylene liner for all runs, the air and $CO_2$ mixture being utilized in an amount of 661 lbs. per hour per square foot in a volume ratio of air to $CO_2$ of 574 to 87.

The performance curves for runs 1 and 2, insofar as the efficiency was concerned, were substantially the same, although the berl saddles had a somewhat lower pressure drop throughout most of the range of variations in liquor rate. The Raschig rings utilized in run 1 had a 1" outside diameter, a 1" length, and a 1/16" wall thickness. Although the Raschig rings were made of steel, in run 1, ceramic berl saddles of the standard 1" variety were utilized in run 2.

Run 3 utilized steel rosettes of substantially the same configuration shown in Figures 1 and 2 wherein the outside diameter of the helix was 3/4", the outside diameter of the torus was 1 7/8", the depth of the filament was 1/32", and the width of the filament was 1/8", the helix having 9 convolutions. Run 4 was conducted utilizing polyethylene rosettes of substantially the same configuration shown in Figures 1 and 2 wherein the outside diameter of the helix was 3/4", the outside diameter of the torus was 1 7/8", the depth of the filament was 1/8" and width of the filament was 1/8", the helix also having 9 convolutions.

Over the wide range of liquor rate employed, it is evident that both the steel rosettes and polyethylene rosettes were considerably more efficient than either of the steel Raschig rings or ceramic berl saddles. Similarly, it is evident from a consideration of Figure 9, that the pressure drop for the rosette type packing unit was much more desirable than the pressure drop encountered in the case of the Raschig rings and berl saddles.

From the description of the invention, it is apparent that superior performance in mass transfer operations involving the contacting of a liquid and gas phase wherein there is movement of at least one component of one of the phases to the other phase that the structure of the units described herein function in a considerably more advantageous manner from an efficiency standpoint as well as a pressure drop standpoint than do the conventionally employed unit packing materials most familiar to commercial operations. Similarly, it has been shown that the units having the specific structure described herein function much more efficiently than do the spring type units which may conceivably be utilized in the manufacture of the structural units described herein.

As a separate phase of the invention, it is apparent that there has been discovered a method of decreasing the wall effect evident in all liquid-gas contact operations regardless of the unit of packing employed and that the wall effect may be minimized substantially through the utilization of a surface adjacent to packing which is substantially nonwetted with respect to the liquid phase.

Although the packing units described herein may be made of a non-wetting material such as polyethylene, polyfluoroethylenes, polychloroethylenes, and polychlorofluoroethylenes, it will be apparent that other materials of construction may be employed most advantageously, and that coating materials may also be employed rather than manufacturing the entire unit from a nonwetted material.

This application is a continuation in part of my copending application bearing Serial No. 342,819, filed March 17, 1953, now abandoned.

What is claimed is:

1. A liquid-gas contact apparatus comprising a tower having inlet and outlet openings and containing a mass of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions.

2. A packing material unit for liquid-gas contact operations, said unit being made up of approximately circular, integrally connected filament portions having their axes approximately tangent to a circle at approximately evenly spaced points therearound, the number of such spaced circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions.

3. A liquid-gas contact apparatus comprising a tower having inlet and outlet openings and containing a mass of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions, said approximately circular filament portions being in integral, continous, end to end relation forming one continuous filament of toroid helical shape.

4. A packing material unit for liquid-gas contact operations, said unit being made up of approximately circular, integrally connected filament portions having their axes approximately tangent to a circle at approximately evenly spaced points therearound, the number of such spaced circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions, said approximately circular filament portions being in integral, continuous, end to end relation forming one continuous filament of toroid helical shape.

5. A liquid-gas contact apparatus comprising a tower having inlet and outlet openings and containing a mass of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions, at least the surfaces of said units being composed of a substance of the class consisting of polyethylene, polychloroethylenes, polychlorofluoroethylenes and polyfluoroethylenes.

6. A packing material unit for liquid-gas contact operations, said unit being made up of approximately circular, integrally connected filament portions having their axes approximately tangent to a circle at approximately evenly spaced points therearound, the number of such spaced circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions, at least the surfaces of said units being composed of a substance of the class consisting of polyethylene, polychloroethylenes, polychlorofluoroethylenes and polyfluoroethylenes.

References Cited in the file of this patent

UNITED STATES PATENTS

| | | |
|---|---|---|
| 2,552,910 | Steinman | May 15, 1951 |
| 2,681,324 | Hochberg | June 15, 1954 |
| 2,686,738 | Teeters | Aug. 17, 1954 |

FOREIGN PATENTS

| | | |
|---|---|---|
| 94,680 | Switzerland | May 16, 1922 |
| 124,348 | Austria | Sept. 10, 1931 |
| 425,424 | Germany | Feb. 18, 1926 |
| 526,609 | Great Britain | Sept. 23, 1940 |
| 582,972 | France | Oct. 24, 1924 |